(12) United States Patent
Ihara

(10) Patent No.: US 8,347,189 B2
(45) Date of Patent: Jan. 1, 2013

(54) DATA TRANSMISSION SYSTEM, PROGRAM AND METHOD

(75) Inventor: Noriyuki Ihara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 960 days.

(21) Appl. No.: 12/335,781

(22) Filed: Dec. 16, 2008

(65) Prior Publication Data
US 2009/0276678 A1 Nov. 5, 2009

(30) Foreign Application Priority Data
May 2, 2008 (JP) .................................. 2008-120216

(51) Int. Cl.
*G06F 11/00* (2006.01)
(52) U.S. Cl. ....................................................... 714/776
(58) Field of Classification Search ................... 714/776
See application file for complete search history.

(56) References Cited

U.S. PATENT DOCUMENTS

| | | | | |
|---|---|---|---|---|
| 4,845,561 A * | 7/1989 | Doyle et al. | ............... | 348/424.1 |
| 4,964,128 A * | 10/1990 | Sako et al. | .................... | 714/762 |
| 5,457,701 A * | 10/1995 | Wasilewski et al. | ........... | 714/776 |
| 5,966,727 A * | 10/1999 | Nishino | ........................ | 711/127 |
| 6,182,261 B1 * | 1/2001 | Haller et al. | .................. | 714/758 |
| 6,378,101 B1 * | 4/2002 | Sinha et al. | ................... | 714/755 |
| 6,490,705 B1 * | 12/2002 | Boyce | ........................... | 714/776 |
| 7,050,410 B1 * | 5/2006 | Kim et al. | ..................... | 370/335 |
| 7,512,843 B2 * | 3/2009 | Kim et al. | ..................... | 714/701 |
| 7,542,435 B2 * | 6/2009 | Leon et al. | ..................... | 370/278 |
| 7,739,580 B1 * | 6/2010 | Fang et al. | .................... | 714/776 |
| 2005/0111371 A1 * | 5/2005 | Miura et al. | ................... | 370/242 |
| 2005/0254427 A1 * | 11/2005 | Leon et al. | .................... | 370/235 |
| 2006/0062314 A1 * | 3/2006 | Palin et al. | .................... | 375/260 |
| 2009/0013136 A1 * | 1/2009 | Chi | .............................. | 711/157 |
| 2009/0222709 A1 * | 9/2009 | Lin et al. | ....................... | 714/776 |
| 2009/0276678 A1 * | 11/2009 | Ihara | ............................. | 714/751 |
| 2009/0310498 A1 * | 12/2009 | Nogami | ........................ | 370/252 |
| 2010/0195764 A1 * | 8/2010 | Murakami | .................... | 375/296 |
| 2010/0218074 A1 * | 8/2010 | Fang et al. | .................... | 714/776 |
| 2010/0266058 A1 * | 10/2010 | Murakami | .................... | 375/260 |
| 2011/0060970 A1 * | 3/2011 | Kim et al. | ..................... | 714/786 |
| 2011/0205983 A1 * | 8/2011 | Bharadwaj et al. | ........... | 370/329 |

FOREIGN PATENT DOCUMENTS

| | | |
|---|---|---|
| JP | 11-177623 | 7/1999 |
| JP | 2006-66973 | 3/2006 |
| WO | WO 2005/046125 | 5/2005 |

* cited by examiner

*Primary Examiner* — Amine Riad
(74) *Attorney, Agent, or Firm* — Staas & Halsey LLP

(57) ABSTRACT

A data transmission system includes a packet missing state data storage unit that stores packet missing state data including distribution of the numbers of consecutive missed packets in a decoder and distribution of intervals of the packet missing in the decoder; an interleave unit determination processing unit that determines, based on the distribution of the numbers of consecutive missed packets, an interleave unit that represents the number of Forward Error Correction (FEC) blocks, wherein the FEC block is a unit for which an FEC packet is generated; an FEC block determination processing unit that determines, based on the distribution of the intervals of the packet missing, the number of data packets included in the FEC block; and a packet communication processing unit that identifies, based on the determined interleave pattern data, a transmission order of the packets to the decoder.

8 Claims, 16 Drawing Sheets

| | MEASUREMENT TIME | | TOTAL NO. OF MISSED PACKETS | NO. OF CONSECUTIVE MISSED PACKETS | | | | INTERVAL OF PACKET MISSING | | | |
|---|---|---|---|---|---|---|---|---|---|---|---|
| | | | | NO. OF TIMES TWO CONSECUTIVE MISSINGS OCCUR | NO. OF TIMES THREE CONSECUTIVE MISSINGS OCCUR | NO. OF TIMES FOUR CONSECUTIVE MISSINGS OCCUR | ... | NO. OF TIMES OF TWO-PACKET INTERVAL | NO. OF TIMES OF THREE-PACKET INTERVAL | NO. OF TIMES OF FOUR-PACKET INTERVAL | ... |
| 1 | START TIME | END TIME | TOTAL NO. OF MISSED PACKETS | NO. OF TIMES TWO CONSECUTIVE MISSINGS OCCUR | NO. OF TIMES THREE CONSECUTIVE MISSINGS OCCUR | NO. OF TIMES FOUR CONSECUTIVE MISSINGS OCCUR | | NO. OF TIMES OF TWO-PACKET INTERVAL | NO. OF TIMES OF THREE-PACKET INTERVAL | NO. OF TIMES OF FOUR-PACKET INTERVAL | |
| 2 | START TIME | END TIME | TOTAL NO. OF MISSED PACKETS | NO. OF TIMES TWO CONSECUTIVE MISSINGS OCCUR | NO. OF TIMES THREE CONSECUTIVE MISSINGS OCCUR | NO. OF TIMES FOUR CONSECUTIVE MISSINGS OCCUR | | NO. OF TIMES OF TWO-PACKET INTERVAL | NO. OF TIMES OF THREE-PACKET INTERVAL | NO. OF TIMES OF FOUR-PACKET INTERVAL | |
| 3 | START TIME | END TIME | TOTAL NO. OF MISSED PACKETS | NO. OF TIMES TWO CONSECUTIVE MISSINGS OCCUR | NO. OF TIMES THREE CONSECUTIVE MISSINGS OCCUR | NO. OF TIMES FOUR CONSECUTIVE MISSINGS OCCUR | | NO. OF TIMES OF TWO-PACKET INTERVAL | NO. OF TIMES OF THREE-PACKET INTERVAL | NO. OF TIMES OF FOUR-PACKET INTERVAL | |

FIG.6

| NORMAL PACKET ORDER | D1 | F1 | D2 | F2 | D3 | F3 | D4 | F4 |
|---|---|---|---|---|---|---|---|---|
| FEC BLOCK NO. | 1-1 | 1-2 | 2-1 | 2-2 | 3-1 | 3-2 | 4-1 | 4-2 |
| PACKET ORDER AFTER INTERLEAVE | D1 | D2 | F1 | F2 | D3 | D4 | F3 | F4 |
| FEC BLOCK NO. AFTER INTERLEAVE | 1-1 | 2-1 | 1-2 | 2-2 | 3-1 | 4-1 | 3-2 | 4-2 |
| NORMAL/INTERLEAVE | N | I | I | N | N | I | I | N |

| D5 | F5 | D6 | F6 | D7 | F7 | D8 | F8 | D9 | F9 |
|---|---|---|---|---|---|---|---|---|---|
| 5-1 | 5-2 | 6-1 | 6-2 | 7-1 | 7-2 | 8-1 | 8-2 | 9-1 | 9-2 |
| D5 | D6 | F5 | F6 | D7 | D8 | F7 | F8 | D9 | D10 |
| 5-1 | 6-1 | 5-2 | 6-2 | 7-1 | 8-1 | 7-2 | 8-2 | 9-1 | 10-1 |
| N | I | I | N | N | I | I | N | N | I |

FIG.9

| NORMAL PACKET ORDER | D1 | D2 | F1 | D3 | D4 | F2 | D5 | D6 | F3 | D7 | D8 | F4 |
|---|---|---|---|---|---|---|---|---|---|---|---|---|
| FEC BLOCK NO. | 1-1 | 1-2 | 1-3 | 2-1 | 2-2 | 2-3 | 3-1 | 3-2 | 3-3 | 4-1 | 4-2 | 4-3 |
| PACKET ORDER AFTER INTERLEAVE | D1 | D4 | F1 | D3 | D2 | F2 | D5 | D8 | F3 | D7 | D6 | F4 |
| FEC BLOCK NO. AFTER INTERLEAVE | 1-1 | 2-2 | 1-3 | 2-1 | 1-2 | 2-3 | 3-1 | 4-2 | 3-3 | 4-1 | 3-2 | 4-3 |
| NORMAL/INTERLEAVE | N | I | N | N | I | N | N | I | N | N | I | N |

| D9 | D10 | F5 | D11 | D12 | F6 | D13 | D14 | F7 | D15 | D16 | F8 |
|---|---|---|---|---|---|---|---|---|---|---|---|
| 5-1 | 5-2 | 5-3 | 6-1 | 6-2 | 6-3 | 7-1 | 7-2 | 7-3 | 8-1 | 8-2 | 8-3 |
| D9 | D12 | F5 | D11 | D10 | F6 | D13 | D16 | F7 | D15 | D14 | F8 |
| 5-1 | 6-2 | 5-3 | 6-1 | 5-2 | 6-3 | 7-1 | 8-2 | 7-3 | 8-1 | 7-2 | 8-3 |
| N | I | N | N | I | N | N | I | N | N | I | N |

| NORMAL PACKET ORDER | D1 | D2 | F1 | D3 | D4 | F2 | D5 | D6 | F3 | D7 | D8 | F4 |
|---|---|---|---|---|---|---|---|---|---|---|---|---|
| FEC BLOCK NO. | 1-1 | 1-2 | 1-3 | 2-1 | 2-2 | 2-3 | 3-1 | 3-2 | 3-3 | 4-1 | 4-2 | 4-3 |
| PACKET ORDER AFTER INTERLEAVE | D1 | F2 | D6 | F1 | D4 | D5 | D2 | D3 | F3 | D7 | F5 | D12 |
| FEC BLOCK NO. AFTER INTERLEAVE | 1-1 | 2-3 | 3-2 | 1-3 | 2-2 | 3-1 | 1-2 | 2-1 | 3-3 | 4-1 | 5-3 | 6-2 |
| NORMAL/INTERLEAVE | N | – | – | – | – | – | – | – | – | N | – | – |

| | D9 | D10 | F5 | D11 | D12 | F6 | D13 | D14 | F7 | D15 | D16 | F8 | D17 | D18 | F9 |
|---|---|---|---|---|---|---|---|---|---|---|---|---|---|---|---|
| | 5-1 | 5-2 | 5-3 | 6-1 | 6-2 | 6-3 | 7-1 | 7-2 | 7-3 | 8-1 | 8-2 | 8-3 | 9-1 | 9-2 | 9-3 |
| | F4 | D10 | D11 | D8 | D9 | F6 | D13 | F8 | D18 | F7 | D16 | D17 | D14 | D15 | F9 |
| | 4-3 | 5-2 | 6-1 | 4-2 | 5-1 | 6-3 | 7-1 | 8-3 | 9-2 | 7-3 | 8-2 | 9-1 | 7-2 | 8-1 | 9-3 |
| | – | N | – | – | – | N | N | – | – | – | N | – | – | – | N |

| NORMAL PACKET ORDER | D1 | D2 | D3 | F1 | D4 | D5 | D6 | F2 | D7 | D8 | D9 | F3 | D10 | D11 | D12 | F4 | D13 | D14 | D15 | F5 | D16 | D17 | D18 | F6 |
|---|---|---|---|---|---|---|---|---|---|---|---|---|---|---|---|---|---|---|---|---|---|---|---|---|
| FEC BLOCK NO. | 1-1 | 1-2 | 1-3 | 1-4 | 2-1 | 2-2 | 2-3 | 2-4 | 3-1 | 3-2 | 3-3 | 3-4 | 4-1 | 4-2 | 4-3 | 4-4 | 5-1 | 5-2 | 5-3 | 5-4 | 6-1 | 6-2 | 6-3 | 6-4 |
| PACKET ORDER AFTER INTERLEAVE | D1 | D5 | D9 | F1 | D4 | D8 | D3 | F2 | D7 | D2 | D6 | F3 | D10 | D14 | D18 | F4 | D13 | D17 | D12 | F5 | D16 | D11 | D15 | F6 |
| FEC BLOCK NO. AFTER INTERLEAVE | 1-1 | 2-2 | 3-3 | 1-4 | 2-1 | 3-2 | 1-3 | 2-4 | 3-1 | 1-2 | 2-3 | 3-4 | 4-1 | 5-2 | 6-3 | 4-4 | 5-1 | 6-2 | 4-3 | 5-4 | 6-1 | 4-2 | 5-3 | 6-4 |
| NORMAL/INTERLEAVE | N | I | I | N | I | I | I | N | I | I | I | N | N | I | I | N | I | I | I | N | I | I | I | N |

FIG.12

DATA TRANSMISSION SYSTEM, PROGRAM AND METHOD

CROSS-REFERENCE TO RELATED APPLICATIONS

This application is based upon and claims the benefit of priority of the prior Japanese Patent Application No. 2008-120216, filed on May 2, 2008, the entire contents of which are incorporated herein by reference.

FIELD

The embodiments discussed herein relate to a technique for transmitting data.

BACKGROUND

As an error correction technique in the real time IP image transmission, conventionally, Forward Error Correction (FEC) was implemented. In the FEC, because normal data packets and an FEC packet for the error correction are transmitted from an encoder to a decoder, even when one packet is missed, it is possible for the decoder to recover the one missed packet. However, when two or more packets are missed among the data packets, which are covered by one FEC packet, a retransmission request is transmitted to the encoder by Automatic Repeat reQuest (ARQ) to obtain missed packets from the encoder. Thus, the retransmission request is always transmitted by ARQ for the missing of two or more packets. Therefore, following problems occur. Namely, redundant packets are transmitted between the encoder and decoder, the load of the network increases, and the data recovery is failed when the buffering time in the decoder is short and the number of retransmission times is a few.

By the way, there is a technique enabling to enhance the service quality without negatively affecting respective services each other when plural services including a video streaming delivery service and a di-directional image communication service coexist. Specifically, a video streaming quality measuring unit of a user terminal obtains quality parameters for the video streaming, a di-directional image communication quality measuring unit obtains quality parameters for the di-directional image communication, and an FEC quality measuring unit obtains quality parameters for the error correction by FEC encoder/decoder and quality parameters for the communication for which RTP encapsulation is made. A receiving rate judging unit of a quality management server receives the quality parameters, and judges the receiving rate of the user terminal. Then, an encode rate controller controls the encode rate held by the user terminal according to the instruction from the receiving rate judging unit. However, there is no consideration for the interleave transmission of packets.

Moreover, there is a technique enabling to reproduce video and/or voice in the optimal delay time while suppressing unnecessary transmission of the retransmission requests, by controlling, in a packet receiving apparatus such as a decoder apparatus, which supports both of FEC and ARQ, transmission timing of the retransmission request, when the packet loss occurs. Specifically, the decoder apparatus has an error correction unit that carries out an error correction processing to recover the missed packet based on a redundant packet received next by a packet receiving unit when the missing of the packet is detected; a retransmission request sending unit that can send the retransmission request of the missed packet to the packet sending apparatus; and a retransmission controller that controls the transmission timing of the retransmission request to the packet sending apparatus by the retransmission request sending unit according to whether or not the missed packet can be recovered by the error correction unit within a predetermined time. However, there is no consideration for the interleave transmission of the packets.

Furthermore, there is a technique, which supports scalable and reliable multicast in a wireless network having large bandwidth delay product. In this technique, the same time slot is allocated to confirmation response packets from various receivers, which receive the loss of the same number of data packets. This method can be combined with other loss recovery techniques such as the recovery by the Forward Error Correction (FEC), preliminary protection, feedback suppression and collision detection. Because a method for using the bandwidth relates to only the number of transmitted packets, not the number of receivers, the scalability is realized. However, there is no consideration for the interleave transmission of the packets.

Moreover, there are a technique suppressing influence of the loss of packets to a reproduction function in a system that transmits real time consecutive stream to a packet communication network in which the loss of the packet is inevitable because the fluctuation of the transmission delay is large and a technique enabling to carry out buffering amount control to cope with a case where packets, which reached over the maximum permissible delay time, are consecutively discarded. Specifically, an apparatus has media input means that can communicate through a network or the like with a receiving terminal that receives and reproduces data and inputs and stores media data; media data compression means that compresses data inputted and stored by the media input means; packet transmission means that generates and transmits packets from the media data compressed by the media data compression means; receiving means that receives packet discard information; transmission mode determining means that determines, according to the packet discard information, whether or not cross-interleave of the transmission data should be carried out; and cross-interleave means that carries out the cross-interleave processing for the transmission data. When the packet discard information, which represents one of arrival states of the packets of the transmission data, which are transmitted from the packet transmission means and for which the cross-interleave processing is not carried out, is received from the receiving terminal and it is determined that the cross-interleave should be carried out, the data packets for which the cross-interleave processing is carried out. However, there is no consideration for the specific adjustment for the packet interleave and the adjustment of the interleave pattern based on data of the receiving side, such as the buffering time.

Such conventional techniques cannot transmit data to be transmitted in real time, according to states of the loss of packets (or missing of packets) while suppressing the calculation amount and the increase of the consumption of the network bandwidth.

SUMMARY

Accordingly, an object of the embodiments is to provide a technique enabling to transmit data according to the states of the loss of packets, while suppressing the calculation amount and the increase of the consumption of the network bandwidth.

According to an aspect of this technique, a data transmission system has a packet missing state data storage unit that stores packet missing state data including distribution of the numbers of consecutive missed packets in a decoder and distribution of intervals of the packet missing in the decoder, an interleave unit determination processing unit that determines, based on the distribution of the numbers of consecutive missed packets, which is stored in the packet missing state data storage unit, an interleave unit that represents the number of Forward Error Correction (FEC) blocks included in a packet range in which the packet interleave is carried out, and stores the interleave unit into an interleave pattern data storage unit, wherein the FEC block is a unit for which an FEC packet is generated; an FEC block determination processing unit that determines, based on the distribution of the intervals of the packet missing, which is stored in the packet missing state data storage unit, the number of data packets included in the FEC block, and stores the number of data packets included in the FEC block into the interleave pattern data storage unit; and a packet communication processing unit that identifies, based on data stored in the interleave pattern data storage unit, a transmission order of the packets to the decoder, and carries out interleave transmission of the packets to the decoder according to the identified transmission order of the packets.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a diagram depicting an example of packet missing state data;

FIG. 9 is a diagram depicting the interleave pattern in which the interleave unit is "2" and the FEC block unit is "1";

FIG. 10 is a diagram depicting the interleave pattern in which the interleave unit is "2" and the FEC block unit is "2";

FIG. 11 is a diagram depicting the interleave pattern in which the interleave unit is "3" and the FEC block unit is "2";

FIG. 12 is a diagram depicting the interleave pattern in which the interleave unit is "3" and the FEC block unit is "3";

DESCRIPTION OF EMBODIMENTS

Figure 1:
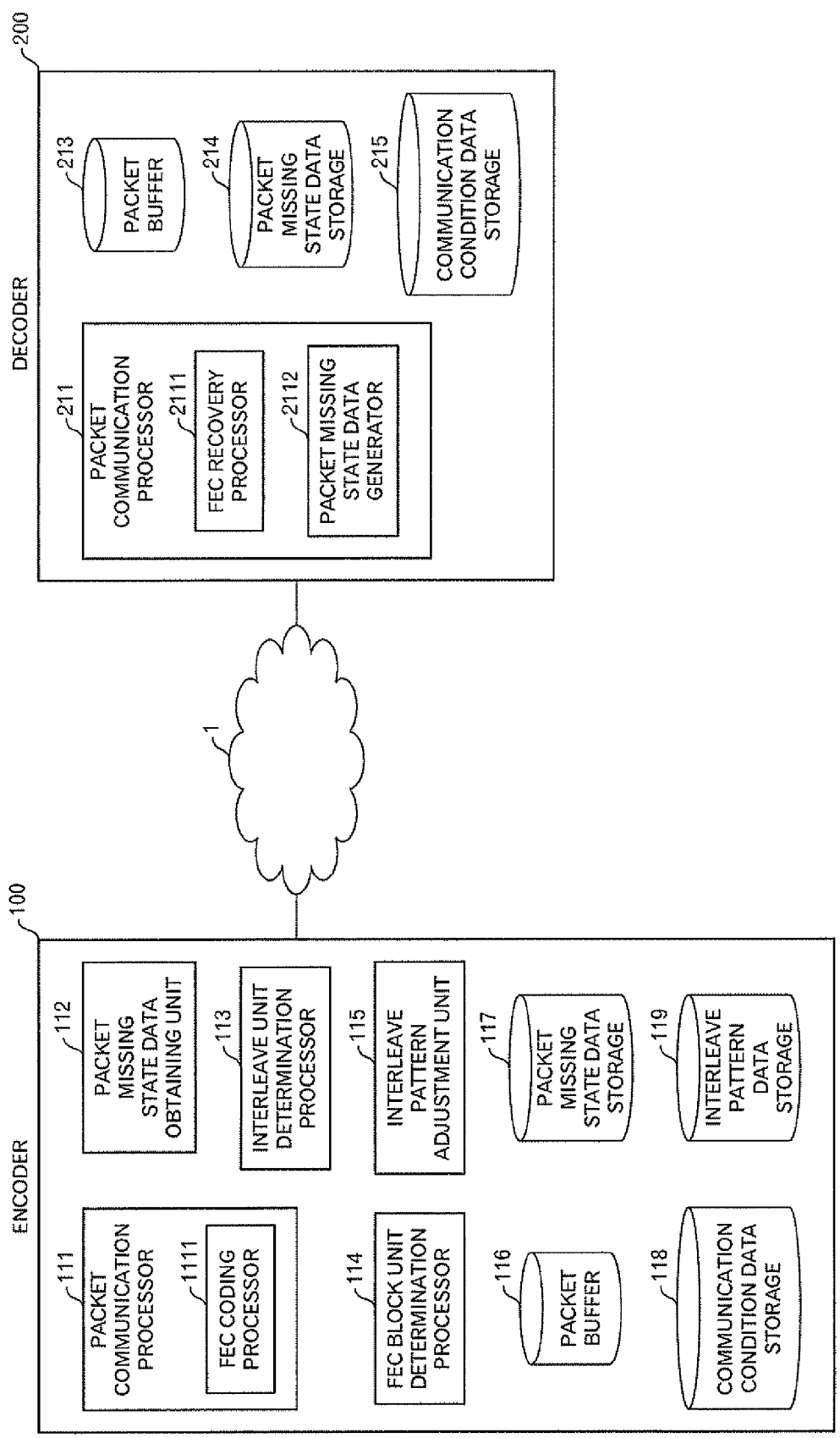
FIG. 1 is a system outline diagram relating to an embodiment of this technique.
Figure 2:
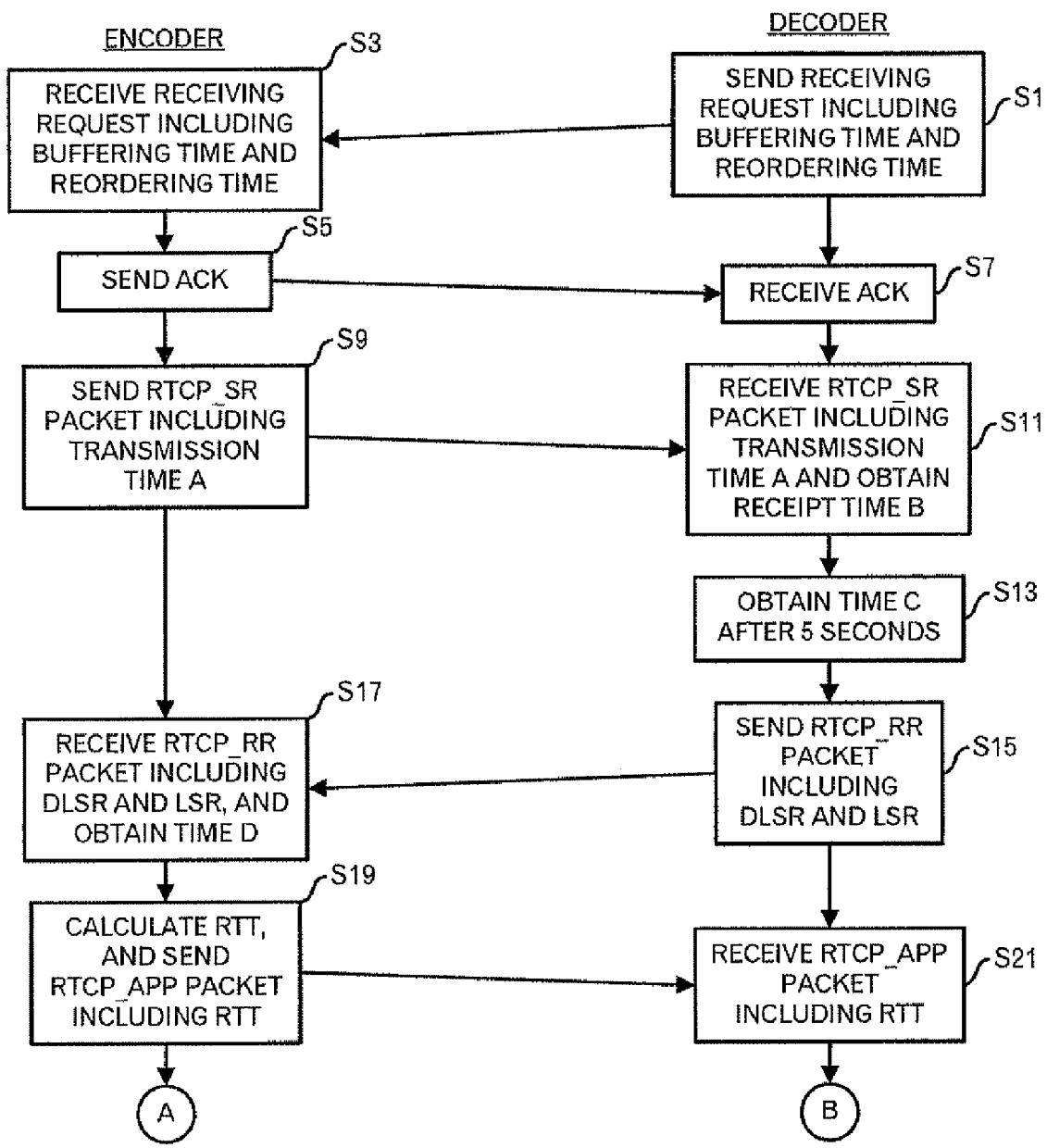
FIG. 2 is a diagram depicting a processing flow relating to the embodiment of this technique.

FIG. 1 depicts a system configuration figure in an embodiment of this technique. An encoder 100 and one or plural decoders 200 are connected to a network 1, which do not have any quality guarantee, such as the Internet.

The encoder 100 has a packet buffer 116 that stores packets to be transmitted to the decoder 200; a packet communication processor 111 that carries out a processing to transmit the packets to be transmitted to the decoder 200 through the network 1; a packet missing state data obtaining unit 112 that obtains packet missing state data collected, for example, in the decoder 200 (according to circumstances, generates the packet missing state data from the retransmission requests of the packets); a packet missing state data storage 117 that stores the packet missing state data obtained by the packet missing state data obtaining unit 112; an interleave unit determination processor 113 that determines, by using data stored in the packet missing state data storage 117, an interleave unit that represents the number of FEC blocks included in a packet range in which the packet interleave is carried out, wherein the FEC block is a unit for which an FEC packet is generated; an FEC block unit determination processor 114 that determines, by using data stored in the packet missing state data storage 117, an FEC block unit that represents the number of data packets included in the FEC block; a communication condition data storage 118 that stores a buffering time and a reordering time in the decoder 200 and a communication bandwidth restriction condition; an interleave pattern adjustment unit 115 that carries out a processing to adjust the interleave pattern determined by the interleave unit determination processor 113 and FEC block unit determination processor 114, by using data stored in the communication condition data storage 118; and an interleave pattern data storage 119 that stores data of the interleave pattern determined by the interleave unit determination processor 113, FEC block unit determination processor 114 and interleave pattern adjustment unit 115.

Incidentally, the packet communication processor 111 identifies the transmission order of the packets stored in the packet buffer 116 according to the interleave pattern stored in the interleave pattern data storage 119, and transmits the packets according to the identified transmission order to the network 1. Moreover, the packet communication processor 111 has an FEC coding processor 1111 that generates an FEC packet from the normal packets according to the interleave pattern data stored in the interleave pattern data storage 119. Because the FEC coding processing and FEC block recovery processing are not main portions of this embodiment, the further explanation is omitted.

In addition, the decoder 200 has a packet communication processor 211 that carries out a processing when receiving the packets from the encoder 100; a packet buffer 213 that stores data of the packets received by the packet communication processor 211; a packet missing state data storage 214 that stores the packet missing state data; and a communication condition data storage 215 that stores communication condition data such as the buffering time and reordering time.

The packet communication processor 211 transmits the communication condition data stored in the communication condition data storage 215 to the encoder 100. In addition, the packet communication processor 211 has an FEC recovery processor 2111 that carries out the recovery processing of the missed packet by using the FEC packet when any normal data packet is missed; and a packet missing state data generator 2112 that generates the packet missing state data from the receiving state of the packet received from the encoder 100.

Next, processing contents of the data transmission system depicted in FIG. 1 will be explained by using FIGS. 2 to 16. First, the packet communication processor 211 of the decoder 200 that needs the data transmission transmits a receiving request including the communication condition data (including the buffering time and reordering time) stored in the communication condition data storage 215 to the encoder 100 through the network 1 (step S1).

The packet communication processor 111 of the encoder 100 receives the receiving request including the buffering time and reordering time from the decoder 200, and stores the buffering time and reordering time in addition to an ID of the decoder 200 into the communication condition data storage 118 (step S3). Then, the packet communication processor 111 transmits a receiving acknowledgment ACK for the receiving request to the decoder 200 (step S5). The packet communication processor 211 of the decoder 200 receives the receiving acknowledgment ACK from the encoder 100 (step S7).

In addition, the packet communication processor 111 of the encoder 100 obtains a transmission time A, and transmits an RTCP SR packet including the transmission time A to the decoder 200 (step S9). The packet communication processor 211 of the decoder 200 receives the RTCP SR packet including the transmission time A from the encoder 100, stores the transmission time A into a storage device such as a main memory, and obtains a receipt time B (step S11). Here, the packet communication processor 211 measures 5 seconds, and obtains a time C when the time-out of 5 seconds is detected (step S13). Then, the packet communication processor 211 generates an RTCP RR packet including DLSR (=C−B) and LSR (=A) and transmits the RTCP RR packet to the encoder 100 (step S15).

The packet communication processor 111 of the encoder 100 receives the RTCP RR packet including the DLSR and LSR from the decoder 200, and stores the DLSR and LSR into a storage device such as the main memory and obtains a receipt time D (step S17). Then, the packet communication processor 111 calculates RTT=D−DLSR−LSR, and generate and transmits to the decoder 200, an RTCP APP packet including the RTT (step S19).

The packet communication processor 211 of the decoder 200 receives the RTCP APP packet including the RTT (step 321), and stores the RTT into the communication condition data storage 215, for example. The following processing shifts to a processing of FIG. 3 through terminals A and B.

Figure 3:
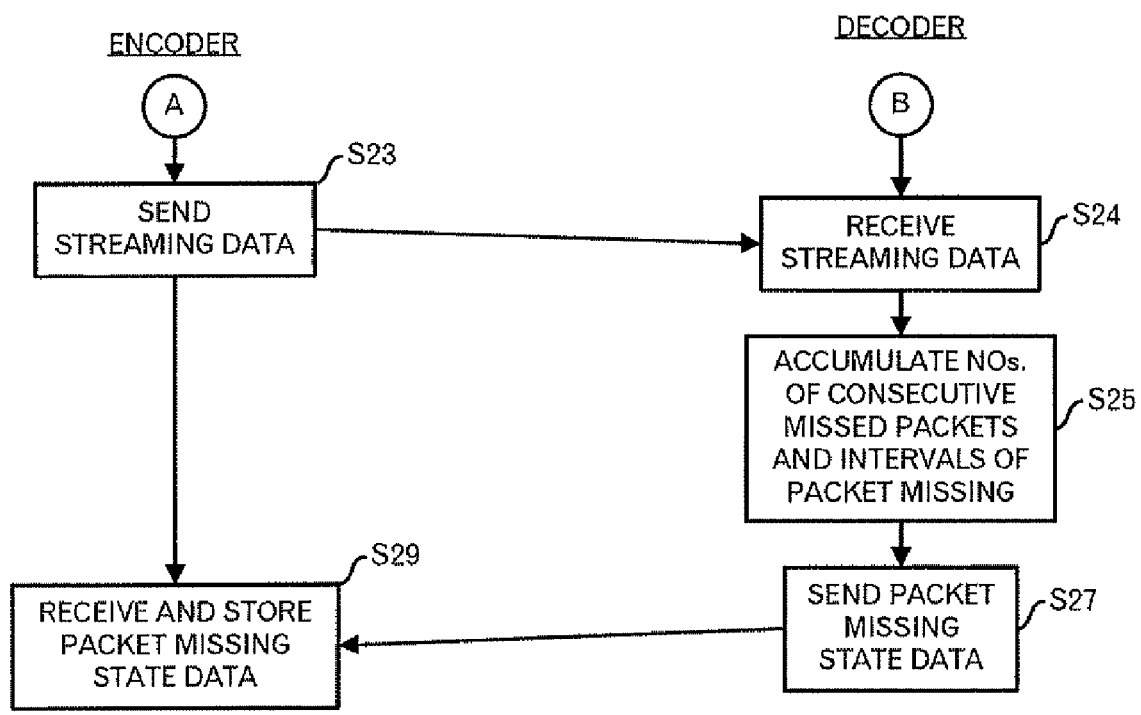
FIG. 3 is a diagram depicting a processing flow relating to the embodiment of this technique.

Shifting to the explanation of the processing depicted in FIG. 3, the packet communication processor 111 of the encoder 100 firstly transmits the packets to be transmitted in the normal order (step S23). At this time, the FEC coding processor 1111 may be operated or may not be operated. The packet communication processor 211 of the decoder 200 receives the packets from the encoder 100, and stores the packets into the packet buffer 213 (step S24). A reproduction processor (not depicted) that reproduces data included in the packets reads out and reproduces data from the packet buffer 213.

Thus, the packets are sequentially transmitted from the encoder 100 to the decoder 200, and the packet missing state data generator 2112 included in the packet communication processor 211 of the decoder 200 generates the packet missing state data including the number of consecutive missed packets and data of the intervals of the packet missing according to the packet missing state, and accumulates the packet missing state data into the packet missing state data storage 214 (step S25).

Figure 4:
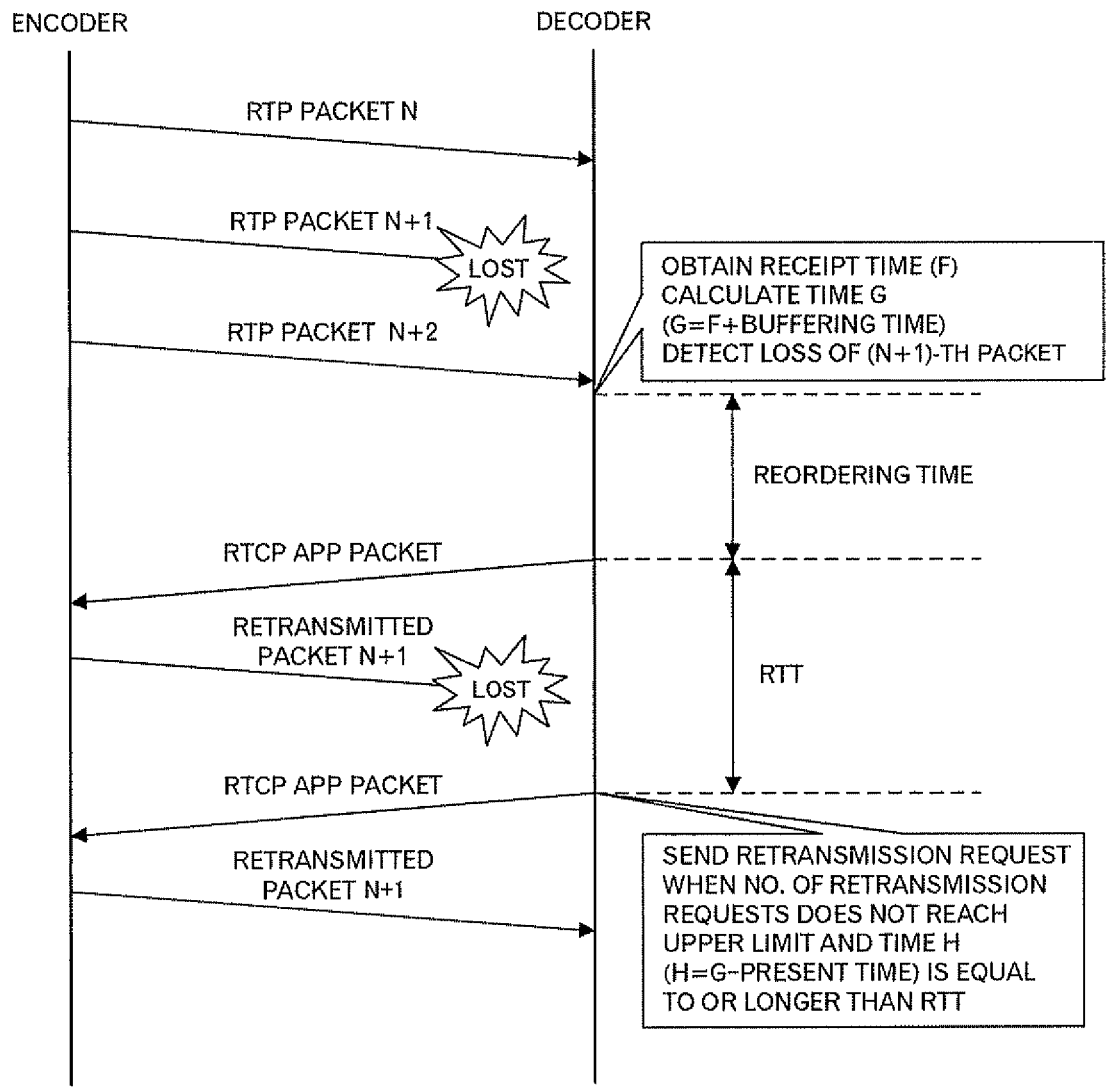
FIG. 4 is a sequence diagram depicting a processing flow relating to the embodiment of this technique.

In these steps S23 to S25, the processing as depicted in FIG. 4 is carried out. The packet communication processor 111 of the encoder 100 transmits, for example, the N-th RTP packet to the decoder 200, and further transmits the (N+1)-th RTP packet and the (N+2)-th RTP packet. When the N-th RTP packet could be received by the packet communication processor 211 of the decoder 200 but the (N+1)-th RTP packet was lost in the network 1, the packet communication processor 211 of the decoder 200 obtains the receipt time F of the (N+2)-th RTP packet when the (N+2)-th RTF packet is received, and calculates a time G (=F+buffering time), which is a time to begin the reproduction processing. This time G is a time at which the (N+1) th RTP packet is given up if it is impossible to receive the (N+1)-th RTP packet.

In addition, because the loss of the (N+1)-th RTP packet was detected, the packet missing state data generator 2112 identifies an interval with the preceding packet missing, and stores the interval into the packet missing state data storage 214. Furthermore, the packet missing data generator 2112 starts counting the number of consecutive missed packets. Similarly, it also starts counting an interval with a next packet missing. However, because the (N+2)-th RTP packet has already been received in this example, the number of consecutive missed packets is "none".

Figure 5:
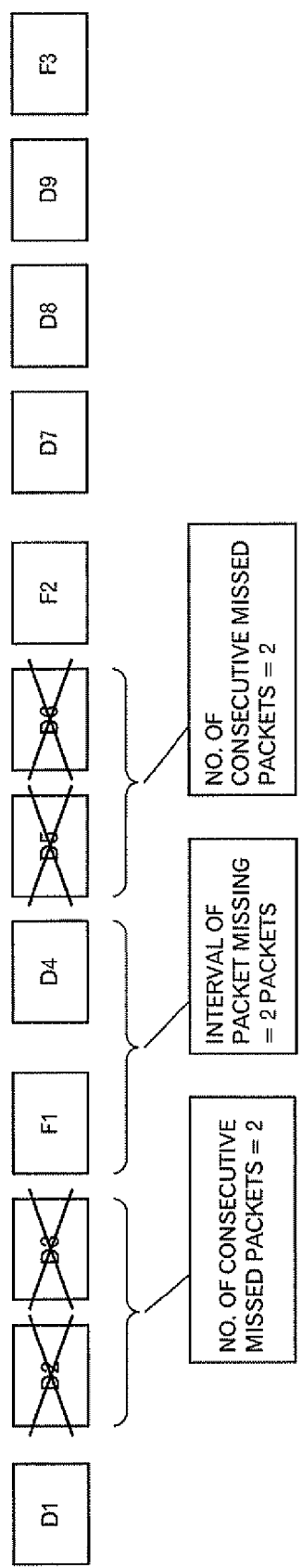
FIG. 5 is a diagram depicting a counting example of the number of consecutive missed packets and the interval of the packet missing.

The number of consecutive missed packets and the packet missing interval, which are included in the packet missing state data are counted as depicted in FIG. 5. Dx in FIG. 5 represents the RTP packet, and Fx represents the FEC packet. In an example of FIG. 5, it is assumed that the packets are transmitted in an order of D1, D2, D3, F1, D4, D5, D6, F2, D7, D8, D9, F3, . . . , and the packet missings of D2 and D3, and D5 and D6 are detected. In such a case, the number of consecutive missed packets for the packet missing of D2 and D3 is recognized as being "2". Similarly, the number of consecutive missed packets for the packet missing of D5 and D6 is recognized as being "2". Then, the interval of these packet missings is recognized as being "2", because F1 and D4 exist between them.

Thus, by calculating the number of consecutive missed packets and the interval of the packet missing and storing them into the packet missing state data storage 214, data as depicted, for example, in FIG. 6 is stored in the packet missing state data storage 214. In an example of FIG. 6, the total number of missed packets, distribution of the numbers of consecutive missed packets (the number of times in which two consecutive missed packets occurred, the number of times in which three consecutive missed packets occurred, . . . ) are registered for every measurement time period (from start time to end time). That is, the packet missing state data generator 2112 increments the pertinent count in the table depicted in FIG. 6.

Then, the packet communication processor 211 of the decoder 200 measures the reordering time from the receipt time F of the (N+2)-th RTP packet, and when the (N+1)-th RTP packet is not received and recovered by the FEC packet until the reordering time passes, the RTCP APP packet requesting the retransmission of the (N+1)-th RTP packet is transmitted. Furthermore, the measurement of the RTT is started. In addition, the number of times in which the retransmission request is transmitted is counted.

When the packet communication processor 111 of the encoder 100 receives the RTCP APP packet requesting the retransmission of the (N+1)-th RTP packet from the decoder 200, the packet communication processor 111 retransmits the (N+1)-th RTP packet. Here, it is assumed that the (N+1)-th packet is missed in the network 1. Then, when the number of times in which the retransmission request is transmitted does not reach the upper limit value and the time H (=G−present time) is equal to or longer than RTT, the decoder 200 transmits the RTCP APP packet requesting the retransmission of the (N+1)-th packet to the encoder 100.

When the packet communication processor 111 of the encoder 100 receives the RTCP APP packet requesting the retransmission of the (N+1)-th RTP packet from the decoder 200, the packet communication processor 111 retransmits the (N+1)-th RTP packet. Such processing is repeated. Then, the packet missing state data generator 2112 accumulates the packet missing state data including the distribution of the numbers of consecutive missed packets and the distribution of the intervals of the packet missing into the packet missing state data storage 214.

Incidentally, as described above, when, by using the FEC packet and remaining received packets in the same FEC block, the lost packet can be recovered by the FEC recovery processor 2111, it becomes unnecessary to transmit the RTCP APP packet requesting the retransmission.

Then, the packet communication processor 211 of the decoder 200 transmits the packet missing state data to the encoder 100 for each predetermined time period (FIG. 3: step S27). When the packet missing state data obtaining unit 112 of the encoder 100 receives the packet missing state data from the decoder 200, and stores the data into the packet missing state data storage 117 (step S29). Data as depicted in FIG. 6 is accumulated in the packet missing state data storage 117.

After this, the encoder 100 carries out a processing as depicted in FIGS. 7 to 13. Similarly to the step S29, the packet missing state data received from the decoder 200 is accumulated into the packet missing state data storage 177 (step S51). Then, the packet missing state data obtaining unit 112 of the encoder 100 judges whether or not the packet missing state data is accumulated for a predetermined time period, periodically (step S53). When the packet missing state data for the decoder 200 is not accumulated for a predetermined time period, the processing returns to the step S51.

On the other hand, when the packet missing state data for the decoder 200 has been accumulated for a predetermined time period, the packet missing state data obtaining unit 112 instructs the interleave unit determination processor 113 and the FEC block unit determination processor 114 to start the processing. The interleave unit determination processor 113 selects an interleave unit according to the most frequent value of the numbers of consecutive missed packets for the decoder 200, which is stored in the packet missing state data storage 117, and stores the interleave unit into the interleave pattern data storage 119 (step S55). Specifically, when the most frequent value of the numbers of consecutive missed packets is "3", "3" is set as the interleave unit. Namely, it is preliminarily determined that three EEC blocks including data packets, which are used to generate the FEC packet, are interleaved. When the interleave is not carried out, plural missed packets in one FEC block may occur. However, when the interleave is carried out, it is possible to limit the number of errors to one in one FEC block as much as possible.

Furthermore, the FEC block unit determination processor 114 selects the FEC block unit according to the most frequent value of the intervals of the packet missing, and stores the FEC block unit into the interleave pattern data storage 119 (step S57). Specifically, when the most frequent value of the intervals of the packet missing is "4", it is preliminarily determined that the number of data packets in one FEC block is "3". This is because the possibility of the recovery becomes high when the appearance interval of the FEC packet is adjusted to the most frequent value of the intervals of the packet missing.

Figure 8:
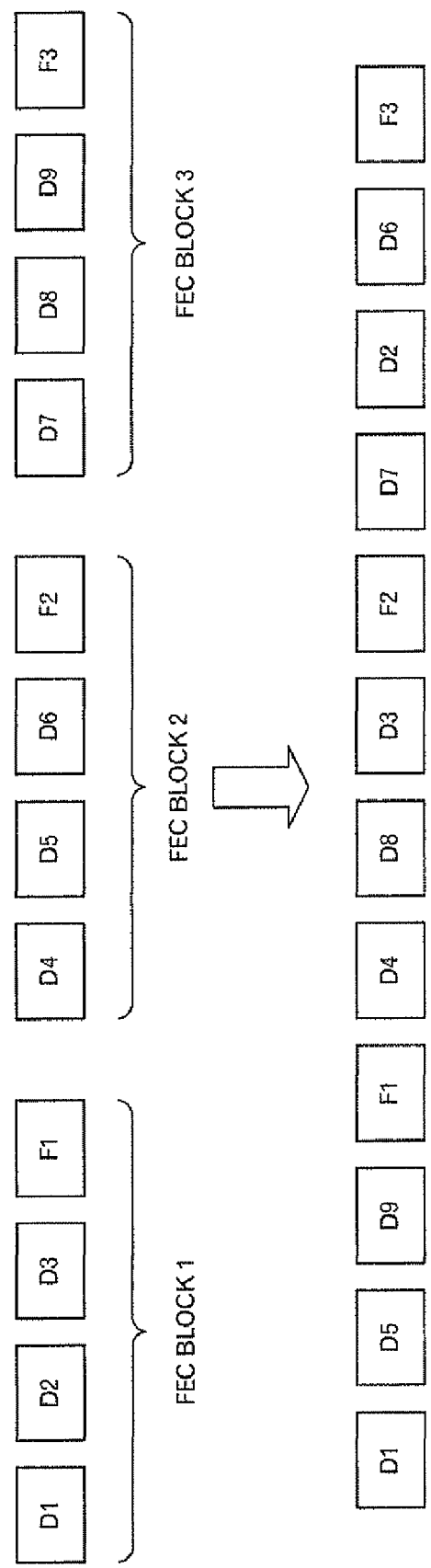
FIG. 8 is a diagram to explain an interleave pattern.

Like the example as described above, when the interleave unit is "3" and the FEC block unit is "3", the interleave pattern as depicted in FIG. 8 is adopted. That is, in the normal state, the FEC packet F1 is generated from the data packets D1 to D3, and the FEC block 1 includes these data packets. In addition, the FEC packet F2 is generated from the data packets D4 to D6, and the FEC block 2 includes these data packets. The FEC packet F3 is generated from the data packets D7 to D9, and the FEC block 3 includes these data packets.

In such a packet configuration, sequentially, the first packet D1 is picked up from the FEC block 1, the second packet D5 is picked up from the FEC block 2, the third packet D9 is picked up from the FEC block 3, the FEC packet F1 is picked up from the FEC block 1, the first packet D4 is picked up from the FEC block 2, the second packet D8 is picked up from the FEC block 3, the third packet D3 is picked up from the FEC block 1, the FEC packet F2 is picked up from the FEC block 2, the first packet D7 is picked up from the FEC block 3, the second packet D2 is picked up from the FEC block 1, the third packet D6 is picked up from the FEC block 2, and the FEC packet F3 is picked up from the FEC block 3.

The details of interleave pattern examples will be depicted in FIGS. 9 to 12. FIG. 9 depicts an interleave pattern in a case where the interleave pattern unit is "2" and the FEC block unit is "1". In an example of FIG. 9, the first line represents an arrangement of the normal packets, the second line represents the FEC block number (which is represented in a manner "block number-block-inside number", the third line represents an arrangement of the packets after the interleave, the fourth line represents the FEC block number after the interleave and the fifth line represents whether or not the packet is interleaved, that is, Normal (N)/Interleave (I). "Normal" represents its order is the same as the normal packet order, and "Interleave" represents its order is different from the normal packet order.

In such an interleave pattern, one FEC packet is needed per one packet. Therefore, the transmission bandwidth becomes double. In addition, as depicted by an arrow, the maximum delay is a time for one packet, compared with the normal packet order. Namely, the maximum packet delay time is a time to receive one packet.

FIG. 10 depicts an interleave pattern when the interleave unit is "2" and the FEC block unit is "2". A table configuration in FIG. 10 is the same as that in FIG. 9. In such an interleave pattern, because one FEC packet is needed per two packets, the transmission bandwidth becomes 1.5 times. In addition, as depicted by an arrow, the maximum delay is a time for three packets, compared with the normal packet order. Namely, the maximum packet delay time is a time to receive three packets.

FIG. 11 depicts an interleave pattern when the interleave unit is "3" and the FEC block unit is "2". The table configuration in FIG. 11 is the same as that in FIG. 9. In such an interleave pattern, because one FEC packet is needed per two packets, the necessary transmission bandwidth becomes 1.5 times. In addition, as depicted by an arrow, the maximum delay is a time for 5 packets. Namely, the maximum packet delay time is a time to receive 5 packets. Thus, when the interleave unit increase, the maximum packet delay time becomes longer.

FIG. 12 depicts an interleave pattern when the interleave unit is "3" and the FEC block unit is "3". The table configuration in FIG. 12 is the same as that in FIG. 9. In such an interleave pattern, because one FEC packet is needed per three packets, the necessary transmission bandwidth becomes 1.33 times. In addition, as depicted by an arrow, the maximum delay is a time for 8 packets, compared with the normal packet order. Namely, the maximum packet delay time is a time to receive 8 packets. Thus, when the FEC block unit increases, the maximum packet delay time becomes longer.

Data concerning the maximum packet delay time (e.g. the number of delay packets) and data concerning the necessary transmission bandwidth are stored, for each interleave pattern, for example, in the communication condition data storage 118, and by referring to the communication data storage 118, the pertinent maximum packet delay time and necessary transmission bandwidth are identified.

Figure 7:
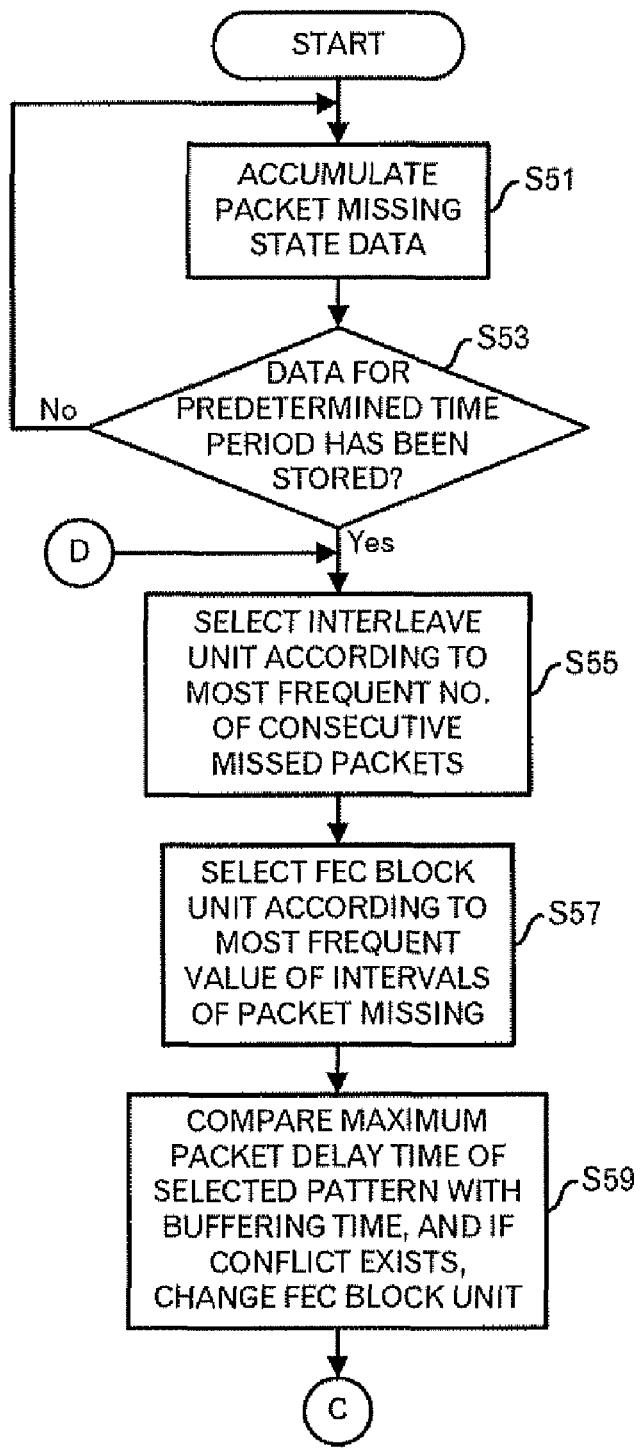
FIG. 7 is a diagram depicting a processing flow relating to the embodiment of this technique.

Returning to the explanation of FIG. 7, next, the interleave pattern adjustment unit 115 compares the maximum packet delay time identified from the interleave pattern selected above with the buffering time for the decoder 200, which is stored in the communication condition data storage 118, and when the maximum packet delay time is longer than the buffering time, the interleave pattern adjustment unit 115 decreases the FEC block unit so that the maximum delay time is shorter than the buffering time and stores the FEC block unit after the decrease into the interleave pattern data storage 119 (step S59).

When the decoder 200 detects the packet missing, the decoder 200 sends the retransmission request of ARQ if the present time is within the buffering time. However, if the present time exceeds the buffering time, the decoder 200 carries out the reproduction processing (i.e. decoding) by assuming the packet is lost. Thus, the encoder 100 cannot carries out an interleave that causes the maximum packet delay time, which exceeds the buffering time. For example, in a case of 384 Kbps and one packet including 1000 Bytes, 48 packets can be sent per one second, the packet interval time is 20.83 ms. In a case of 8-packet delay, the delay time becomes 166.66 ms (=20.83*8). Therefore, when the buffering time is equal to or shorter than 166.66 ms, the interleave pattern with 8-packet delay cannot be selected. In the aforementioned example, it is impossible to select an interleave pattern in which the interleave unit is "3" and the FEC block unit is "3". Therefore, the FEC block unit should be decreased, and an interleave pattern in which the interleave unit is "3" and the FEC block unit is "2" is selected.

Figure 13:
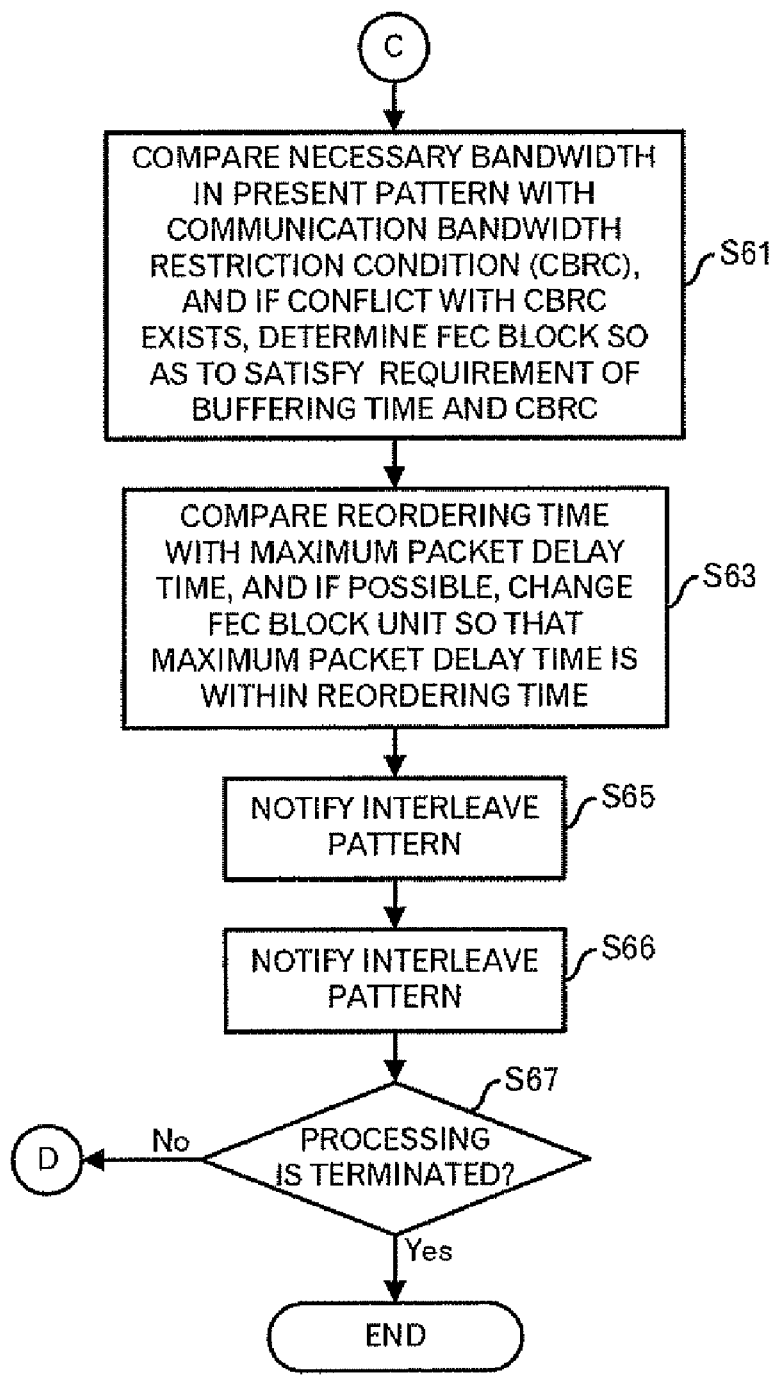
FIG. 13 is a diagram depicting a processing flow relating to the embodiment of this technique.
Figure 14:
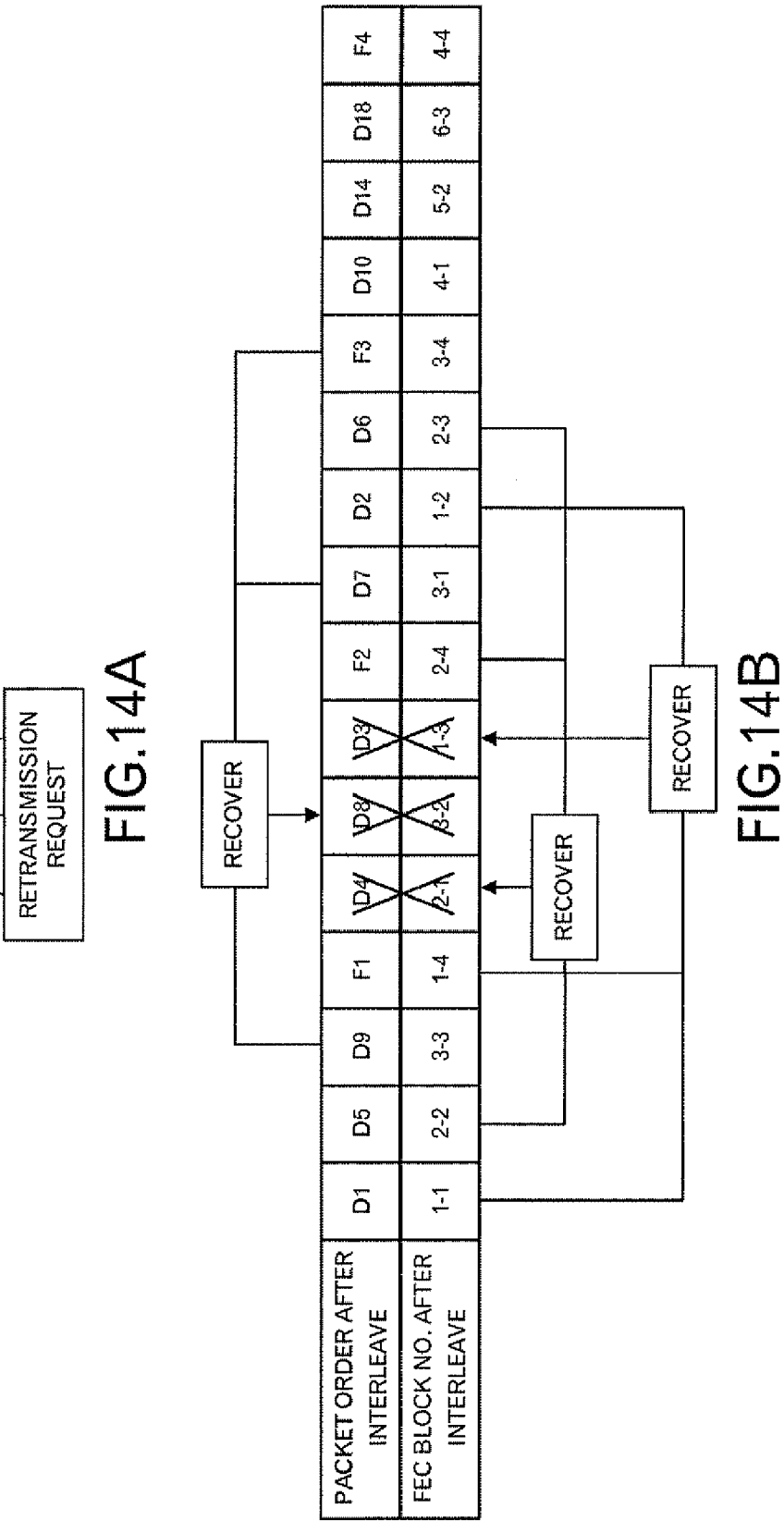
FIG. 14 is a diagram to explain an effect of the embodiment of this technique.

The processing shifts to a processing of FIG. 13 through a terminal C. The interleave pattern adjustment unit 115 compares the necessary bandwidth identified from the interleave pattern selected above with the communication bandwidth restriction condition in the data transmission for the decoder 200, which is stored in the communication condition data storage 118, and when the necessary bandwidth does not satisfies the communication bandwidth restriction condition, the interleave pattern adjustment unit 115 decreases the interleave unit in the interleave pattern and determines the FEC block unit so that the buffering time is satisfied (step S61).

For example, in the interleave pattern in which the interleave unit is "3" and the FEC block unit is "2", the necessary bandwidth becomes 1.5 times. Here, when the communication bandwidth restriction condition indicates "less than 1.5 times", the aforementioned interleave pattern cannot be selected. Therefore, as the next best pattern, the interleave pattern unit is decreased to "2" in the step S61. Here, the FEC block unit that satisfies a condition that the delay is less than 8 packets and a condition that the necessary bandwidth is less than 1.5 times is selected. When the FEC block unit is "2", the necessary bandwidth always becomes 1.5 times. Therefore, it is necessary to increase the FEC block unit should to "3" or more. Furthermore, it is necessary that the delay is less than 8 packets. Therefore, the interleave pattern in which the interleave unit is "2" and the FEC block unit is "3" is selected because the maximum packet delay for this interleave pattern is "5".

Furthermore, the interleave pattern adjustment unit 115 compares the maximum packet delay time identified from the interleave pattern selected above with the reordering time in the decoder 200, which is stored in the communication condition data storage 118, and if possible, changes the FEC block unit so that the maximum packet delay time is within the reordering time, and stores the changed FEC block unit into the interleave pattern data storage 119 (step S63).

As described above, when the existence of the packet missing is detected by the decoder 200, the decoder 200 transmits the retransmission request to the encoder 100 after the reordering time is passed. Therefore, there is no need to transmit the retransmission request to the encoder 100 when the maximum packet delay time in the interleave is equal to or less than the reordering time. Because the bandwidth of the network 1 is consumed by the retransmission request, it is preferable that the maximum packet delay time is within the ordering time if possible. However, because the reordering time is different from the buffering time, which causes drop frames if it is not satisfied, and does not influence the reproduction quality, the maximum packet delay time is suppressed within the reordering time "if possible". Incidentally, in the aforementioned example, because the communication bandwidth restriction condition cannot be satisfied when the FEC block unit is further decreased, the step S63 is skipped here.

After such an interleave pattern determination processing was carried out, the packet communication processor 111 transmits data representing the interleave pattern stored in the interleave pattern data storage 119 to the decoder 200 so as to correctly generate the packet missing state data in the decoder 200 (step S65). After that, the packet communication processor 111 starts transmitting the packets according to the interleave pattern stored in the interleave pattern data storage 119 (step S66).

When the packet communication processor 211 of the decoder 200 receives data representing the interleave pattern, the packet communication processor 211 stores the data into a storage device such as a main memory, and detects the packet missing based on this data. That is, when the interleave unit is "2" and the FEC block unit is "3", the packets are received in an order of D1, D5, D9, F1, D4, D8, D3 and F2. Therefore, when D9 and F1 cannot be received, it is judged that the third and fourth packets are consecutively lost. Then, the packet missing state data generator 2112 reflects the detected packet missing state to the packet missing state data storage 214.

Then, the processing from the step S55 to S66 through a terminal D is repeated until the processing is terminated (e.g. until the data transmission from the encoder 100 to the decoder 200 is finished.) (step S67).

By carrying out such a processing, it is possible to transmit the packets from the encoder 100 in such a manner that the decoder 200 can recover the lost packets as much as possible, according to the aforementioned packet missing state.

For example, as depicted in FIG. 14A, the packets are transmitted in the normal order, and when D4, D5 and D6 are lost, they cannot be recovered only by the FEC packet F2. However, when the packets are transmitted in an order depicted in FIG. 14B according to the interleave pattern, the lost packets can be recovered using the pertinent remaining packets by the FEC recovery processing 2111 without transmitting the retransmission request, even if the packets are lost at the same position. This is because only one packet in one respective FEC blocks, such as D4, D8 and D3, is lost.

Incidentally, when the packet missing state data is accumulated in the decoder 200, following settings are preferable. Namely, the maximum count value of the number of consecutive missed packets and the maximum count value of the interval of the packet missing are set, and the counting is terminated if the count values respectively exceed the maximum count values. That is, when the number of FEC blocks, which can be interleaved, is restricted, the consecutive missed packets, whose number exceeds a product (e.g. 25) of the number of FEC blocks (e.g. 5) and the FEC block unit+1 (e.g. 4+1=5), are not counted. Furthermore, the interval of the packet missing is not counted if the interval exceeds the maximum size of the FEC block, which cannot be handled in the decoder 200.

In the aforementioned example, the packet missing state data generator 2112 is provided in the decoder 200 and generates the distribution data of the numbers of consecutive missed packets and the distribution data of the intervals of the packet missing and transmits the distribution data to the encoder 100. However, it is not always necessary to generate such data in the decoder 200. Because the encoder 100 knows the transmission order of the packets, it is possible for the encoder to generate the packet missing state data if the packet, which is a target of the retransmission request, can be identified from the received retransmission request of ARQ.

Figure 15:
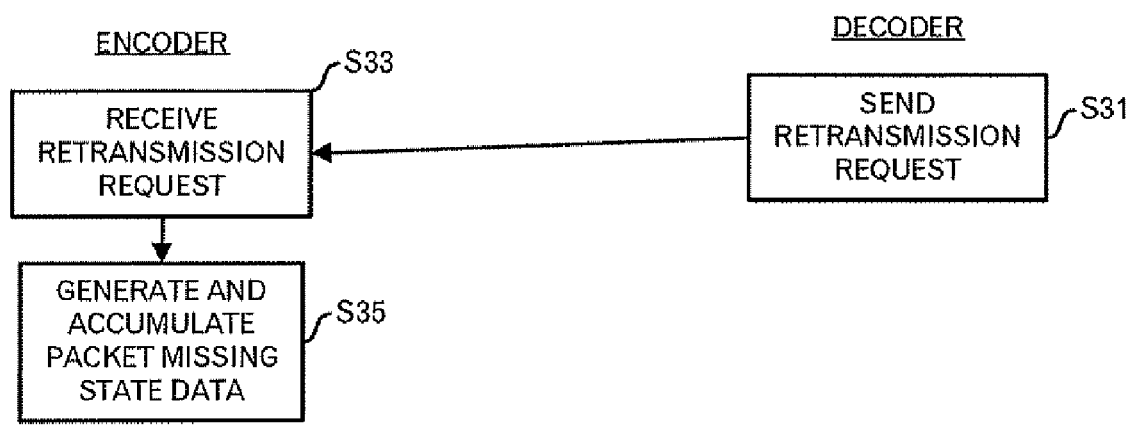
FIG. 15 is a diagram depicting a portion of a processing flow in another embodiment of this technique.

That is, on behalf of the steps S27 and S29 in FIG. 3, when the packet missing is detected, the packet communication processor 211 of the decoder 200 sends the encoder 100 the RTCP APP packet requesting the retransmission of a specific packet as normally carried out (FIG. 15: step S31). The packet communication processor 111 of the encoder 100 receives the RTCP APP packet requesting the retransmission of the specific packet from the decoder 200, the packet communication processor 111 designates and outputs the specific packet to the packet missing state data obtaining unit 112. The packet missing state data obtaining unit 112 identifies the packet missing state according to the interleave pattern stored in the interleave pattern data storage 119 or data indicating the interleave is not carried out, in such a case, generates the packet missing data, and stores the packet missing state data into the packet missing state data storage 117.

Figure 16A:
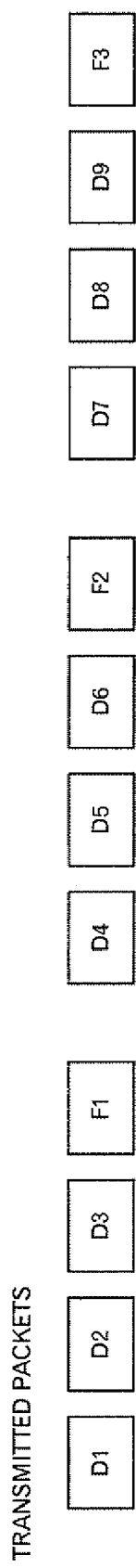
FIG. 16 is a diagram to explain the generation of the packet missing state data in the encoder.
Figure 16B:

For example, when the packets are transmitted in an order of FIG. 16A (i.e. the FEC block unit is "3" and the interleave is not carried out) and the retransmission requests for D2 and D3 and D5 and D6 are received as depicted in FIG. 16B, the packet missing state data obtaining unit 112, for example, compares the lost packets with the transmission order, identifies twice for the number "2" of consecutive missed packets and once for the interval "2" of the packet missing, and stores such data into the packet missing state data storage 117.

Thus, it is possible to accumulate the packet missing state data in the encoder 100 without large modification of the configuration in the decoder 200 and carry out an appropriate packet interleave according to the packet missing state data. Thereby, it is possible to appropriately carry out the data transmission to be carried out in real time while suppressing the increase of the consumed network bandwidth.

Although the embodiments of this technique were described, this technique is not limited to these embodiments. For example, the functional blocks depicted in FIG. 1 are mere examples, and they are not always identical with an actual program module configuration. Furthermore, the functional blocks depicted in FIG. 1 may be implemented by a combination of processors and programs and may be implemented by dedicated semiconductor chips.

The aforementioned embodiments are summarized as follows.

According to an aspect of this technique, a data transmission system has a packet missing state data storage unit that stores packet missing state data including distribution of the numbers of consecutive missed packets in a decoder and distribution of intervals of the packet missing in the decoder; an interleave unit determination processing unit that determines, based on the distribution of the numbers of consecutive missed packets, which is stored in the packet missing state data storage unit, an interleave unit that represents the number of Forward Error Correction (FEC) blocks included in a packet range in which the packet interleave is carried out, and stores the interleave unit into an interleave pattern data storage unit, wherein the FEC block is a unit for which an FEC packet is generated; an FEC block determination processing unit that determines, based on the distribution of the intervals of the packet missing, which is stored in the packet missing state data storage unit, the number of data packets included in the FEC block, and stores the number of data packets included in the FEC block into the interleave pattern data storage unit; and a packet communication processing unit that identifies, based on data stored in the interleave pattern data storage unit, a transmission order of the packets to the decoder, and carries out interleave transmission of the packets to the decoder according to the identified transmission order of the packets.

Thus, by determining the interleave unit according to the distribution (e.g. characteristic statistical value (e.g. the most frequent value or average)) of the numbers of consecutive missed packets and determining the number of data packets included in the FEC block according to the distribution (e.g. the most frequent value or average)) of the intervals of the packet missing, it becomes possible to carry out the data transmission according to the packet loss state while suppressing the increase of the consumed network bandwidth and the calculation amount.

In addition, this data transmission system may further has a communication condition data storage unit that stores communication condition data including a buffering time in the decoder; and an adjustment unit that compares the buffering time stored in the communication condition data storage unit with the maximum packet delay time identified from data stored in the interleave pattern data storage unit, and, upon detecting that the maximum packet delay time exceeds the buffering time, decreases the number of data packets included in the FEC block, which is stored in the interleave pattern data storage unit, so that the maximum packet delay time does not exceeds the buffering time, and stores the decreased number of data packets included in the FEC block into the interleave pattern data storage unit. Thus, it is possible to reduce the transmission frequency of the retransmission request of the lost packet while preventing the drop frame, and to suppress the increase of the consumed network bandwidth.

In addition, the aforementioned communication condition data may include a communication bandwidth restriction condition. In such a case, the aforementioned adjustment unit compares the communication bandwidth restriction condition stored in the communication condition data storage unit with necessary bandwidth identified from data stored in the interleave pattern data storage unit, and upon detecting that the necessary bandwidth does not satisfy the communication bandwidth restriction condition, decreases the interleave unit stored in the interleave pattern data storage unit, identifies the number (e.g. maximum number) of data packets included in the FEC block so as to satisfy the condition of the buffering time and the communication bandwidth restriction condition, and stores the identified number of data packets included in the FEC block into the interleave pattern data storage unit. Thus, it becomes possible to adjust the consumed network bandwidth to the communication bandwidth restriction condition.

Furthermore, the aforementioned communication condition data may include a reordering time. In such a case, the aforementioned adjustment unit compares the reordering time stored in the communication condition data storage unit with the maximum packet delay time identified from data stored in the interleave pattern data storage unit, and upon detecting that the maximum packet delay time exceeds the reordering time, identifies the number of data packets included in the FEC block so that the maximum packet delay time does not exceed the reordering time while satisfying the communication bandwidth restriction condition, and stores the identified number of data packets included in the FEC block into the interleave pattern data storage unit. Thus, it is possible to decrease the transmission frequency of the retransmission requests of the lost packets. However, although the drop frame occurs when the lacked packet cannot be obtained in the buffering time, the drop frame does not occur even when the requirement of the reordering time is not satisfied. Therefore, this processing may be skipped.

Furthermore, this data transmission system may further has a unit that receives the packet missing state data from the decoder, and stores the received packet missing state data into the packet missing state data storage unit. When a generator of the packet missing state data can be provided in the decoder, the configuration of the encoder becomes simple. Incidentally, when carrying out the packet interleave, data concerning the interleave pattern is notified to the decoder in order to correctly generate the packet missing state data in the decoder.

Moreover, this data transmission system may further include a unit that receives a retransmission request of a specific packet from the decoder, generates the packet missing state data from a transmission order of the specific packet, and stores the packet missing state data into the packet missing state data storage unit. Thus, it is possible to reduce the modification of the decoder.

Incidentally, it is possible to create a program causing the encoder to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

In addition, even when portions of the processing flows are depicted straight-forwardly, such portions may be executed in parallel or the processing order may be exchanged if the processing result does not change.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A data transmission system, comprising:
   a first data storage unit to store packet missing state data including a distribution of numbers of consecutive missed packets in a decoder and distribution of intervals of packets missing in said decoder;
   a first determination processing unit to determine, based on said distribution of said numbers of consecutive missed packets, stored in said first data storage unit, an interleave unit including a number of Forward Error Correction (FEC) blocks included in a packet range over which packet interleave is carried out, and to store said interleave unit into a second data storage unit, wherein said FEC block is a block unit for which an FEC packet is generated;
   a second determination processing unit to determine, based on said distribution of said intervals of said missing packets stored in said first data storage unit, a number of data packets included in said FEC block, and to store said number of data packets included in said FEC block into said second data storage unit; and
   a communication processing unit to identify, based on data stored in said second data storage unit, a transmission order of said packets to said decoder, and to carry out packet interleave of said packets to said decoder according to the identified transmission order of said packets.

2. The packet transmission system as set forth in claim 1, further comprising:
   a third data storage unit to store communication condition data including a buffering time in said decoder; and
   an adjustment unit to compare said buffering time stored in said third data storage unit with a maximum packet delay time identified from data stored in said second data storage unit, and, upon detecting that said maximum packet delay time exceeds said buffering time, to decrease said number of data packets included in said FEC block stored in said second data storage unit, so that said maximum packet delay time does not exceed said buffering time, and to store the decreased number of data packets included in said FEC block into said second data storage unit.

3. The data transmission system as set forth in claim 2, wherein said communication condition data includes a communication bandwidth restriction condition, and said adjustment unit to compare said communication bandwidth restriction condition stored in said third data storage unit with a necessary bandwidth identified from data stored in said second data storage unit, and upon detecting that said necessary bandwidth does not satisfy said communication bandwidth restriction condition, to decrease said interleave units stored in said second data storage unit, to identify said number of data packets included in said FEC block so as to satisfy a condition concerning said buffering time and said communication bandwidth restriction condition, and to store said identified number of data packets included in said FEC block into said second data storage unit.

4. The data transmission system as set forth in claim 3, wherein said communication condition data includes a reordering time, and said adjustment unit to compare said reordering time stored in said third data storage unit with said maximum packet delay time identified from data stored in said second data storage unit, and upon detecting that said maximum packet delay time exceeds said reordering time, to identify said number of data packets included in said FEC block so that said maximum packet delay time does not exceed said reordering time while satisfying said communication bandwidth restriction condition, and to store the identified number of data packets included in the FEC block into said second data storage unit.

5. The data transmission system as set forth in claim 1, further comprising:
   a receiving unit to receive said packet missing state data from said decoder, and to store the received packet missing state data into said first data storage unit.

6. The data transmission system as set forth in claim 1, further comprising:
   a receiving unit to receive a retransmission request of a specific packet from said decoder, to generate said packet missing state data from a transmission order of a specific packet, and to store said packet missing state data into said first data storage unit.

7. A data transmission method, comprising:

obtaining packet missing state data including a distribution of numbers of consecutive missed packets in a decoder and distribution of intervals of missing packets in said decoder;

determining, based on said distribution of said numbers of consecutive missed packets, an interleave unit that represents a number of Forward Error Correction (FEC) blocks included in a packet range over which packet interleave is carried out, wherein said FEC block is a block unit for which an FEC packet is generated;

determining, based on said distribution of said intervals of said missing packets, a number of data packets included in said FEC block; and identifying, based on the determined interleave unit and the determined number of data packets included in said FEC block, a transmission order of said packets to said decoder, and carrying out packet interleave of said packets to said decoder according to the identified transmission order of said packets.

8. A non-transitory computer-readable storage medium storing a program for causing an encoder to execute a process comprising:

obtaining packet missing state data including a distribution of numbers of consecutive missed packets in a decoder and distribution of intervals of missing packets in said decoder;

determining, based on said distribution of said numbers of consecutive missed packets, an interleave unit that represents a number of Forward Error Correction (FEC) blocks included in a packet range over which packet interleave is carried out, wherein said FEC block is a block unit for which an FEC packet is generated;

determining, based on said distribution of said intervals of said missing packets, a number of data packets included in said FEC block; and identifying, based on the determined interleave unit and the determined number of data packets included in said FEC block, a transmission order of said packets to said decoder, and carrying out packet interleave of said packets to said decoder according to the identified transmission order of said packets.

* * * * *